United States Patent
Truong et al.

(10) Patent No.: US 10,528,358 B2
(45) Date of Patent: Jan. 7, 2020

(54) INITIALIZE PORT

(71) Applicant: Hewlett-Packard Development Company, L.P., Houston, TX (US)

(72) Inventors: Binh T. Truong, Houston, TX (US); Larry W. Kunkel, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 15/535,214

(22) PCT Filed: Jan. 23, 2015

(86) PCT No.: PCT/US2015/012769
§ 371 (c)(1),
(2) Date: Jun. 12, 2017

(87) PCT Pub. No.: WO2016/118171
PCT Pub. Date: Jul. 28, 2016

(65) Prior Publication Data
US 2017/0344383 A1     Nov. 30, 2017

(51) Int. Cl.
| | | |
|---|---|---|
| G06F 9/00 | (2006.01) | |
| G06F 9/24 | (2006.01) | |
| G06F 15/177 | (2006.01) | |
| G06F 9/4401 | (2018.01) | |
| G06F 11/00 | (2006.01) | |
| G06F 11/22 | (2006.01) | |
| G06F 13/38 | (2006.01) | |

(52) U.S. Cl.
CPC ......... *G06F 9/4403* (2013.01); *G06F 9/4411* (2013.01); *G06F 11/004* (2013.01); *G06F 11/221* (2013.01); *G06F 11/2284* (2013.01); *G06F 13/385* (2013.01)

(58) Field of Classification Search
CPC ........................................ G06F 9/44
See application file for complete search history.

(56) References Cited

U.S. PATENT DOCUMENTS

| | | | |
|---|---|---|---|
| 6,401,198 B1 * | 6/2002 | Harmer | 713/1 |
| 6,434,696 B1 | 8/2002 | Kang | |
| 6,598,159 B1 * | 7/2003 | McAlister | G06F 9/4416 709/222 |
| 7,213,139 B2 | 5/2007 | Zhang | |
| 8,661,164 B2 | 2/2014 | Chen et al. | |
| 9,548,108 B2 * | 1/2017 | Yu | G11C 16/3431 |
| 9,921,629 B2 * | 3/2018 | Berke | G06F 1/3234 |

(Continued)

FOREIGN PATENT DOCUMENTS

TW     I436278 B     5/2014

OTHER PUBLICATIONS

Intel® NUC—Using Fast Boot in Intel® Visual BIOS 1.x, Feb. 16, 2013, pp. 1-2, Intel Corporation.

*Primary Examiner* — Mohammed H Rehman
(74) *Attorney, Agent, or Firm* — Brooks Cameron & Huebsch PLLC

(57) ABSTRACT

An apparatus to initialize a port includes a first input-output port to connect to a first device and a control unit to initialize all input-output ports of the apparatus when the apparatus is booted and to skip a power-on self-test (POST) of the first input-output port in response to a request to skip initialization of the first input-output port while the first input-output port is enabled.

14 Claims, 3 Drawing Sheets

(56) References Cited

U.S. PATENT DOCUMENTS

| | | | |
|---|---|---|---|
| 2003/0084381 A1* | 5/2003 | Gulick | G06F 11/0757 |
| | | | 714/47.1 |
| 2004/0098578 A1 | 5/2004 | Funayama | |
| 2006/0206700 A1 | 9/2006 | Umedu | |
| 2006/0294352 A1* | 12/2006 | Morrison | G06F 9/4401 |
| | | | 713/1 |
| 2007/0157015 A1 | 7/2007 | Swanson et al. | |
| 2008/0270780 A1 | 10/2008 | Lopez et al. | |
| 2012/0226829 A1 | 9/2012 | Takahashi | |
| 2012/0239918 A1 | 9/2012 | Huang | |
| 2013/0138938 A1 | 5/2013 | Bang et al. | |
| 2017/0123884 A1* | 5/2017 | Lai | G06F 11/0757 |

* cited by examiner

INITIALIZE PORT

CROSS-REFERENCE TO RELATED APPLICATION

This application is a U.S. National Stage Application of and claims priority to International Patent Application No. PCT/US2015/012769, filed on Jan. 23, 2015, and entitled "INITIALIZE PORT."

BACKGROUND

Computing devices using operating systems are increasingly popular and more and more electronic devices are being provided with operating systems. Computing devices using operating systems are not accessible to a user for normal operation until the operating system of the device is loaded and operating normally. To protect the operating system from failure, computing devices have various conditions which will trigger the pausing, stopping, and closing of the operating system.

BRIEF DESCRIPTION OF THE DRAWINGS

The following detailed description references the drawings, wherein.

DETAILED DESCRIPTION

Figure 1:
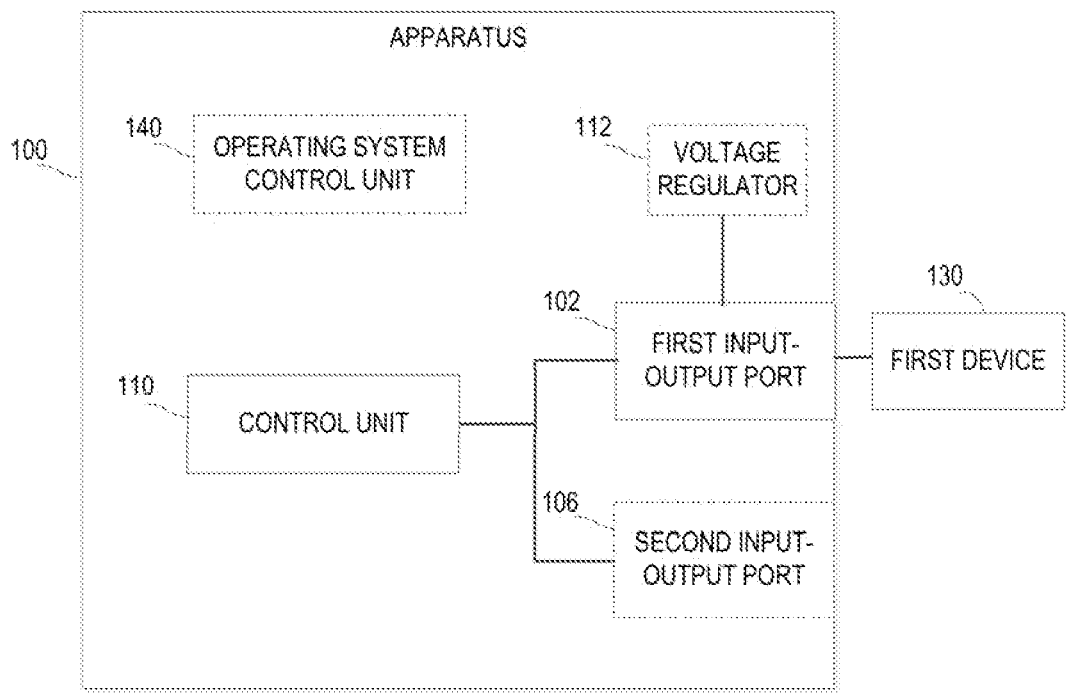
FIG. 1 illustrates a block diagram of an apparatus to initialize a port according to an example.

In the following discussion and in the claims, the term "couple" or "couples" is intended to include suitable indirect and/or direct connections. Thus, if a first component is described as being coupled to a second component, that coupling may, for example, be: (1) through a direct electrical or mechanical connection, (2) through an indirect electrical or mechanical connection via other devices and connections, (3) through an optical electrical connection, (4) through a wireless electrical connection, and/or (5) another suitable coupling.

As used herein a "computing device" refers to any electrical device which operates using an operating system that is loaded onto the electronic device, such as, a personal computer, a notebook computer, a tablet computer, a mobile phone, a smart device (e.g., smartwatch), etc. As used herein, "booting" a computer refers to the initialization of a computing device until an operating system of the computing device is loaded. A "hard boot" refers to a booting process in which a power-on self-test (POST) is conducted of all hardware in and coupled to the computing device. In contrasts, a "soft boot" refers to a hooting process in which POST is avoided, for example, after exiting a standby state a personal computer may not perform POST.

The time it takes an operating system to load in a computing device is impacted by a variety of factors including the time it takes to turn on components of the computing device and load the operating system. This process of booting a computer includes providing power to various hardware components of the computer and testing that those hardware components are working before loading the operating system. If a hardware device fails the testing process, the booting process may terminate to prevent damaging the operating system and computer. The operating system will generally not be loaded until all hardware devices connected to the computer have been powered and tested. As the number of hardware devices connected to a computing device increase, the boot time of the computing device increases and there are more chances for hardware devices to fail the testing process. Specific hardware device may fail the testing process for a variety of reasons. In some examples, the reason for failing the testing process may not be detrimental to computing device performance and terminating a boot process may not be needed to protect the computing device from harm. However, the failure of a specific hardware component can delay or prevent an operating system from loading on the computing device.

To address these issues, in the examples described herein, a system that can reduce boot time by skipping initialization of certain ports by skipping the testing process is described. In an example, the system may receive instructions to skip initialization of certain ports before the booting process begins. In such an example, the instructions to skip initialization of certain ports may be instructions to skip a power-on self-test (POST) in a Basic-Input/Output System (BIOS) layer. In some examples, the system may detect whether certain hardware is coupled to certain ports and determine to skip initialization of the ports to which the certain hardware is coupled. In such a manner, the boot time of a computing device may be reduced because the number of ports being initialized during a hard booting process may be reduced.

Referring now to the drawings, FIG. 1 is a block diagram of an apparatus 100 to initialize a port. Apparatus 100 may be a computing device and include a control unit 110 and a first input-output port 102. First input-output port 102 may be coupled to a first device 130. Although depicted as separate from apparatus 100 in FIG. 1, first device 130 is not limited thereto, and first device 130 may be a component of apparatus 100. For example, first device 130 may be an internal memory storage of apparatus 100 or any other hardware device on a circuit board (e.g., motherboard) of apparatus 100. In some examples, apparatus 100 may also include a second input-output port 106, a voltage regulator 112, and an operating system control unit 140.

In an example, first input-output port 102 and/or second input-output port 106 may be a USB port. In other examples, first input-output port 102 and/or second input-output port 106 may be any other type of port capable of coupling to a hardware device, such as, memory, storage, keyboard, mouse, printer, etc.

Control unit 110 may control the initialization of first input-output port 102 and/or second input-output port 106. In some examples, control unit 110 may control the initialization of first input-output port 102 and/or second input-output port 106 in the Basic-Input/Output System (BIOS) layer of apparatus 100. BIOS may be stored in a storage device of the computing device, such as Read Only Memory (ROM), erasable programmable read only memory (EPROM), electrically erasable programmable read-only memory (EEPROM), etc., which is used in the booting process of apparatus 100. In some examples, control unit 110 may skip a POST of first input-output port 102 and/or second input-output port 106 in response to instructions to skip initialization of first input-output port 102 and/or second input-output port 106. In an example, instructions to skip initialization of first input-output port 102 may be stored in a storage device accessed as part of the hard boot process, such as, ROM, EPROM, and EEPROM, etc. In such an example, the instructions to skip initialization of first input-output port 102 may be stored in the BIOS layer. In some examples, the instructions to skip initialization of first input-output port 102 may be stored in the storage device before the hard boot (i.e., in a prior session) of apparatus 100.

In some examples, the instructions to skip initialization of first input-output port 102 and/or second input-output port 106 may be instructions to skip initialization of first input-output port 102 and/or second input-output port 106 in response to a determination that first device 130 is coupled to first input-output port 102 and/or second input-output port 106. In such an example, control unit 110 may determine whether first device 130 is coupled to first input-output port 102 and/or second input-output port 106 as part of the initialization process before a POST operation is performed or skipped. In an example of FIG. 1, control unit 110 may determine first device 130 is coupled to first input-output port 102 and may skip initialization of first input-output port 102 while initializing and/or second input-output port 106. In such an example, control unit 110 may skip a POST of first input-output port 102 while continuing all other initialization operations with respect to first input-output port 102. For example, control unit 110 may continue to ensure power is provided to first input-output port 102 while skipping a POST of first input-output port 102. In an example, control unit 110 may also control the initialization of second input-output port 106. Control unit 110 may control initialization of second input-output port 106 in the BIOS layer as described above with respect to first input-output port 102.

Voltage regulator 112 may provide power to first input-output port 102. In an example, voltage regulator 112 may provide power to first input-output port 102 when apparatus 100 is booted. In an example, voltage regulator 112 may provide power to first input-output port 102 while control unit 110 initializes or skips initialization of first input-output port 102. As used herein a port is considered "enabled" when sufficient power is provided to the port to operate the port. In an example, when control unit 110 skips initialization of first input-output port 102, voltage regulator 112 supplies power to first input-output port 102 such that first input-output port 102 is enabled. Similarly, in an example, when control unit 110 skips initialization of second input-output port 106 a second voltage regulator (not shown) may supply power to second input-output port 106 such that second input-output port 106 is enabled.

Operating system control unit 140 may load an operating system after control unit 110 has initialized or skipped initialization of all ports of apparatus 100 (i.e., first input-output port 102 and second input-output port 106). The operating system loaded on to apparatus 100 may be any operating system used in a computing device, such as, Linux, Windows®, Windows® Mobile, Android, iOS®, etc.

In an example, first input-output port 102 may be a USB port and first device 130 may be coupled to first input-output port 102 and fail a POST during a hard hoot process because it is not fully USB compliant. In such an example, apparatus 100 may receive instructions to skip initialization of first device 130 in a subsequent hard boot of the apparatus 100. The instructions may be provided via an interface to enter the initialization process, such as, entering the BIOS initialization process. In the interface, apparatus 100 may provide a list of devices coupled to each port of the apparatus 100 (e.g., first input-output port 102 and second input-output port 106). In such an example, apparatus 100 may provide power to first input-output port 102 via voltage regulator 112 while skipping initialization of first input-output port 102. Once the initialization of first input-output port 102 is skipped, control unit 110 may initialize second input-output port 106. In an example, after control unit 110 has completed initialization or skipping of all USB ports in apparatus 100, operating system control unit 140 may load an operating system of apparatus 100. Although first device 130 is described as failing the POST during a hard boot, the examples are not limited thereto and instructions to skip initialization of first device 130 may be received regardless of the ability of first device 130 is to pass POST process. In some examples, the instructions to skip initialization of the hardware device coupled to a certain port may be received from remote device. For example, the instructions to skip initialization may be provided by a system administrator from a remote site.

Figure 2:
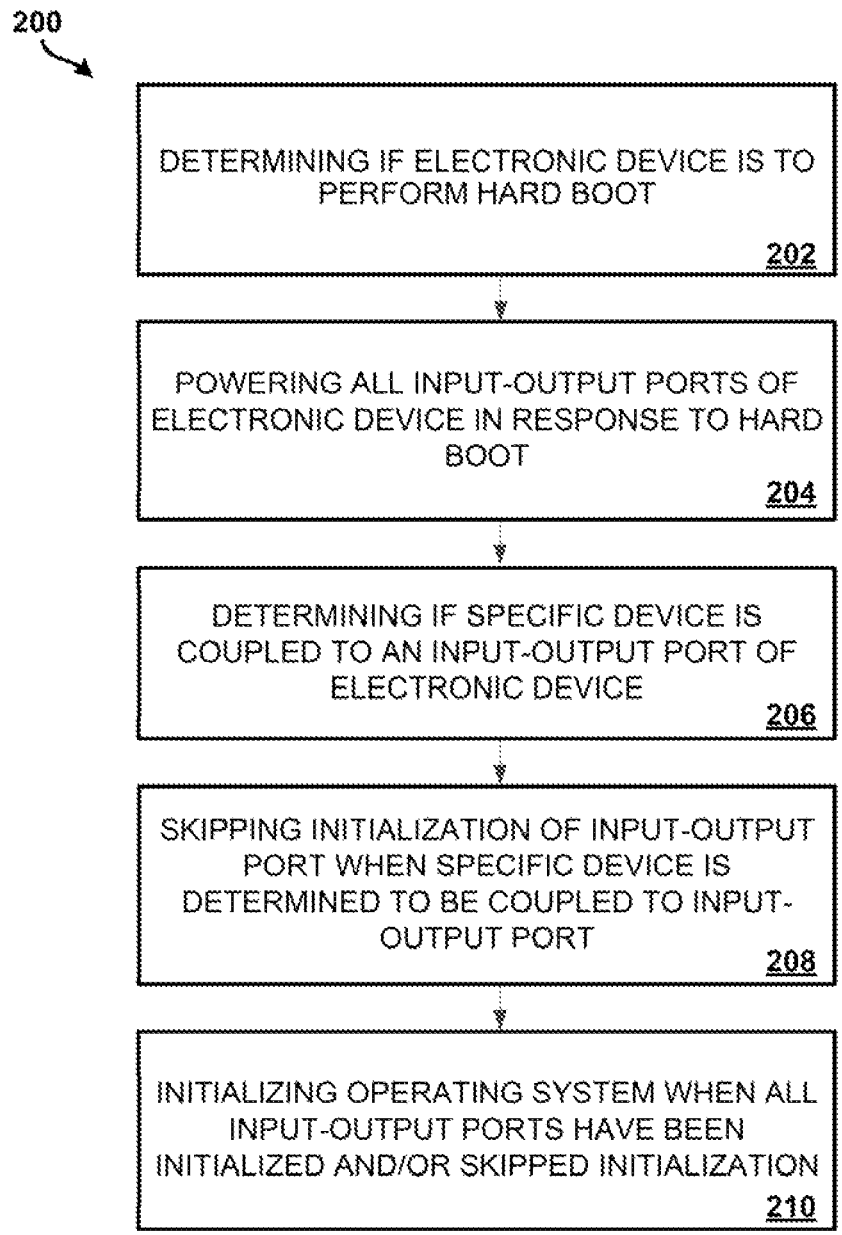
FIG. 2 illustrates a flowchart of a method for controlling an electronic device according to an example.

FIG. 2 illustrates a flowchart of a method 200 for controlling an electronic device according to an example. Although execution of method 200 is described below with reference to apparatus 100 described above, other suitable systems for the execution of method 200 can be utilized. Additionally, implementation of method 200 is not limited to such examples.

At 202 of method 200, control unit 110 determines if apparatus 100 is to perform a hard boot. In some examples, a computing device may perform a hard boot in response to power being provided to the computing device, after exiting a hibernation state, etc.

At 204, apparatus 100 may provide power to all input-output ports, of apparatus 100 (e.g., first input-output port 102 and second input-output port 106) in response to the hard boot. In such an example, voltage regulator 112 may provide power to first input-output port 102. Similarly, a second voltage regulator (not shown) may provide power to second input-output port 106.

At 206, apparatus 100 determines if a specific device is coupled to an input-output port. For example, control unit 110 may determine if first device 130 is coupled to first input-output port 102 or second input-output port 106.

At 208, apparatus 100 is to skip initialization of an input-output port when it is determined a specific device is coupled to that input-output port. In an example, control unit 110 of apparatus 100 is to skip initialization of first input-output port 102 when first device 130 is determined to be coupled to first input-output port 102.

At 210, apparatus 100 is to initialize an operating system when all input-output ports have been initialized or skipped initialization. In an example, operating system control unit 140 is to initialize an operating system of apparatus 100 when all input-output ports (e.g., first output-input unit 102 and second output-input unit 106) have been initialized and/or skipped initialization.

Figure 3:
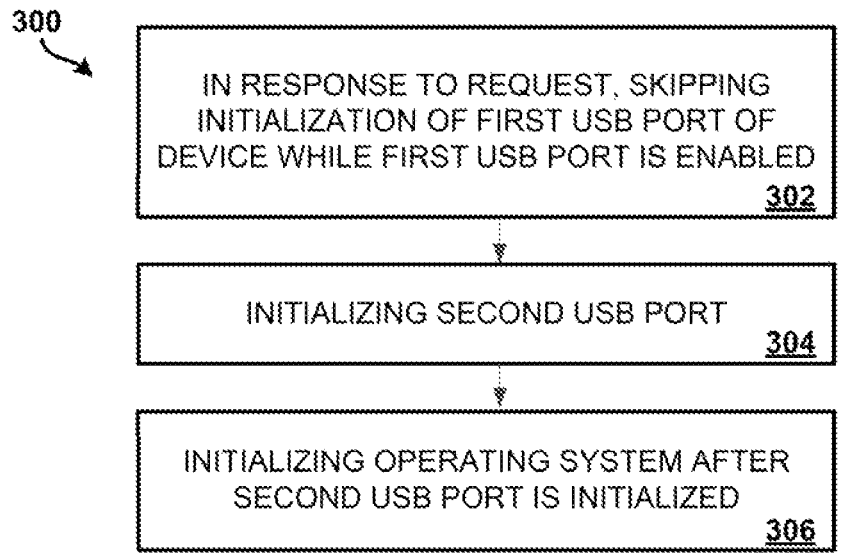
FIGS. 3 and 4 illustrate flowcharts of a method for skipping initialization of a Universal Serial Bus (USB) port according to an example.

FIG. 3 illustrate a flowchart of a method 300 for skipping initialization of a Universal Serial Bus (USB) port according to an example. Although execution of method 300 is described below with reference to apparatus 100 described above, other suitable systems for the execution of method 300 can be utilized. Additionally, implementation of method 300 is not limited to such examples.

At 302 of method 300, apparatus 100, in response to a request, is to skip initialization of a first USB port of apparatus 100 while first USB port is enabled. In an example, apparatus 100 is to skip initialization of first input-output port 102 by skipping a POST of first input-output port 102.

At 304, control unit 110 is to initialize a second USB port (e.g., second input-output port 106). In the example of FIG. 3, control unit 110 is initialize second input-output port 106 by performing a POST on second input-output port 106 in a BIOS layer of apparatus 100.

At 306, operating system control unit 140 is to initialize an operating system after second USB port (e.g., second input-output port 106) is initialized. In the example of FIG. 3, apparatus 100 includes first input-output unit 102 and second input-output port 106. In other examples, a computing device may include more than two input-output ports and the operating system would be loaded once initialization of all input-out ports has been completed or skipped.

Figure 4:
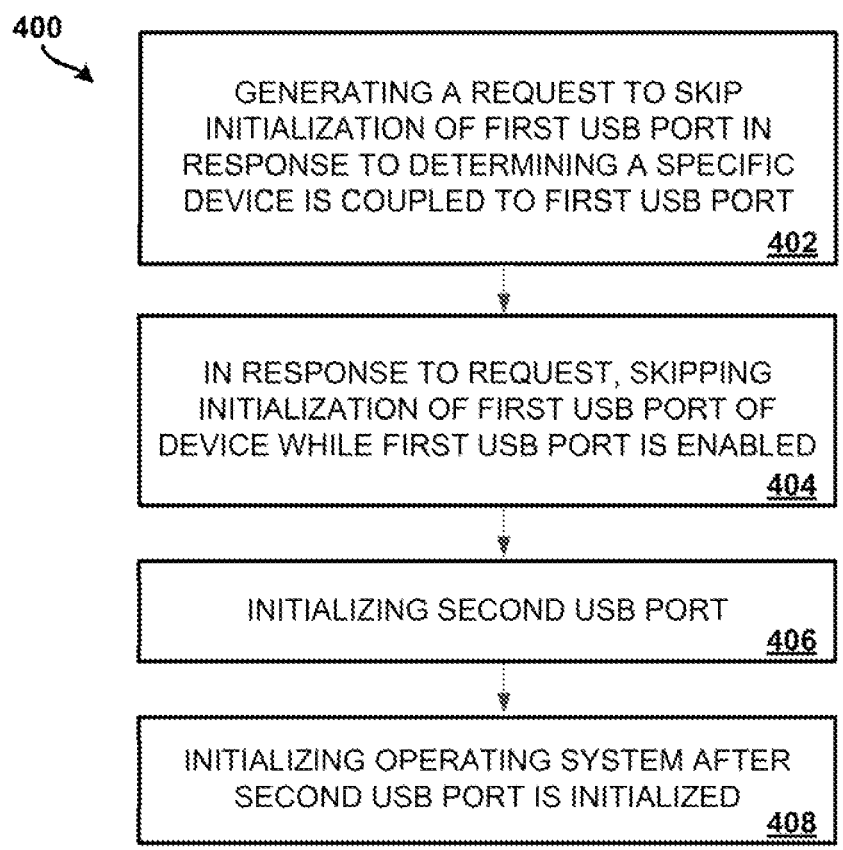

FIG. 4 illustrate a flowchart of a method 400 for skipping initialization of a Universal Serial Bus (USB) port according to an example. Although execution of method 400 is described below with reference to apparatus 100 described above, other suitable systems for the execution of method 400 can be utilized. Additionally, implementation of method 400 is not limited to such examples.

At 402 of method 400, apparatus 100 generates a request to skip initialization of a first USB port in response to determining a specific device is coupled to first USB port. For example, apparatus 100 generates the request to skip initialization in response to determining first device 130 is coupled to first input-output port 102.

At 404, apparatus 100, in response to a request to skip initialization of the first USB port, is to skip initialization of the first USB port of apparatus 100 while first USB port is enabled. In the example of FIG. 4, control unit 110 of apparatus 100 is to skip initialization of first input-output port 102 by skipping a POST operation on first input-output port 102 while voltage regulator 112 is providing sufficient power to enable first input-output port 102.

At 406, control unit 110 is to initialize a second USB port (e.g., second input-output port 106). In the example of FIG. 4, control unit 110 is to initialize second input-output port 106 by performing a POST on second input-output port 106 in a BIOS layer of apparatus 100.

At 408, operating system control unit 140 is to initialize an operating system after the second USB port (e.g., second input-output port 106) is initialized. In the example of FIG. 4, apparatus 100 includes first input-output unit 102 and second input-output port 106. In other examples, a computing device may include more than two input-output ports and the operating system would be loaded once initialization of all input-out ports has been completed or skipped.

What is claimed is:

1. An apparatus to initialize a port, comprising:
    a first input-output port to connect to a first device;
    a control unit to initialize all input-output ports of the apparatus when the apparatus is booted and to skip a power-on self-test (POST) of the first input-output port in response to a request to skip initialization of the first input-output port while the first input-output port is enabled, wherein the apparatus receives instructions to skip initialization from a remote device; and
    a voltage regulator to provide power to the first input-output port in response to the control unit skipping initialization of first input-output port.

2. The apparatus of claim 1, further comprising:
    a second input-output port to connect to a second device, wherein the control unit is to skip POST of the second input-output port in response to a request to skip initialization of the second input-output port.

3. The apparatus of claim 1, wherein the control unit is to provide information on the first device before receiving instructions regarding initialization of the first input-output port.

4. The apparatus of claim 1, wherein the first input-output port is a Universal Serial Bus (USB) port.

5. The apparatus of claim 1, wherein the control unit is to skip initialization of the first input-output port in a Basic Input/Output System (BIOS) layer.

6. The apparatus of claim 1, further comprising an operating system control unit to initialize an operating system of the apparatus when the control unit has completed initialization or skipped initialization of all the input-output ports of the apparatus.

7. A method for controlling an electronic device, comprising:
    determining if the electronic device is to perform a hard boot;
    powering all input-output ports of the electronic device in response to the hard boot;
    determining if a specific device is coupled to an input-output port of the electronic device;
    skipping initialization of an input-output port when the specific device is determined to be coupled to the input-output port, wherein instructions to skip initialization is received from a remote device;
    receiving power at the input-output port from a voltage regulator to enable the input-output port in response to receiving instructions to skip initialization; and
    initializing an operating system when all input-output ports have been initialized and/or skipped initialization.

8. The method of claim 7, wherein the input-output port is enabled while initialization of the input-output port is skipped.

9. The method of claim 7, wherein skipping initialization of the input-output port occurs in the Basic Input/Output System (BIOS) layer.

10. The method of claim 7, wherein skipping initialization of the input-output port includes skipping a power-on self-test (POST) of the input-output port.

11. A method for skipping initialization of a Universal Serial Bus (USB) port, comprising:
    in response to a request, skipping initialization of a first USB port of a device while the first USB port is enabled, wherein the device receives instructions to skip initialization from a remote device, and the first USB port receives power from a voltage regulator in response to receiving request to skip initialization;
    initializing a second USB port;
    initializing an operating system after the second USB port is initialized, wherein skipping initialization of the first USB port includes skipping a power-on self-test (POST) of the first USB port.

12. The method of claim 11, wherein a voltage regulator of the first USB port is to provide power to the first USB port while skipping initialization of the first USB port.

13. The method of claim 11, wherein a voltage regulator of the second USB port is to provide power to the second USB port while initializing the second USB port.

14. The method of claim 11, further comprising receiving a request to skip initialization of the first USB port in response to determining a specific device is coupled to the first USB port.

* * * * *